(12) United States Patent
Kamiwada et al.

(10) Patent No.: US 8,706,853 B2
(45) Date of Patent: Apr. 22, 2014

(54) CONTENT PROCESSING APPARATUS, CONTENT PROCESSING METHOD, AND RECORDING MEDIUM

(75) Inventors: Toru Kamiwada, Kawasaki (JP); Hironori Sakakihara, Kawasaki (JP); Eiji Hasegawa, Kawasaki (JP); Takuya Sakamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 88 days.

(21) Appl. No.: 12/507,245

(22) Filed: Jul. 22, 2009

(65) Prior Publication Data

US 2010/0023594 A1 Jan. 28, 2010

(30) Foreign Application Priority Data

Jul. 25, 2008 (JP) ................................. 2008-191566

(51) Int. Cl.
  *G06F 15/173* (2006.01)

(52) U.S. Cl.
  USPC ........................... 709/223; 709/224; 709/231

(58) Field of Classification Search
  USPC ......... 709/201, 203, 205, 206, 207, 208, 217, 709/219, 227, 231, 223, 224, 232
  See application file for complete search history.

(56) References Cited

U.S. PATENT DOCUMENTS

| 8,099,482 B2 * | 1/2012 | Clark et al. ................... 709/223 |
| 8,176,118 B2 * | 5/2012 | Nagasaka et al. ............. 709/203 |
| 8,239,515 B2 * | 8/2012 | Chapweske ................... 709/223 |
| 2003/0028623 A1 | 2/2003 | Hennessey et al. |
| 2005/0177624 A1 * | 8/2005 | Oswald et al. ................ 709/219 |
| 2006/0126124 A1 | 6/2006 | Nonaka et al. |
| 2007/0078928 A1 | 4/2007 | Yang et al. |
| 2007/0174246 A1 * | 7/2007 | Sigurdsson et al. .............. 707/3 |
| 2009/0222515 A1 * | 9/2009 | Thompson et al. ........... 709/203 |
| 2010/0011060 A1 * | 1/2010 | Hilterbrand et al. .......... 709/204 |

FOREIGN PATENT DOCUMENTS

| JP | 11-219313 | 8/1999 |
| JP | 2001-101061 | 4/2001 |
| JP | 2006-172097 | 6/2006 |
| JP | 2006-235742 | 9/2006 |
| JP | 2006-325011 | 11/2006 |
| JP | 2007-104656 | 4/2007 |
| JP | 2008-9729 | 1/2008 |
| WO | WO 03/015377 | 2/2003 |

OTHER PUBLICATIONS

Japanese Office Action for Application No. 2008-191566 mailed Jun. 26, 2012.
Japanese Office Action issued Mar. 19, 2013 for Japanese Application No. 2008-191566.

* cited by examiner

*Primary Examiner* — Lashonda Jacobs
(74) *Attorney, Agent, or Firm* — Staas & Halsey LLP

(57) ABSTRACT

A content processing apparatus includes an extracting part extracting undownloaded contents from a list of downloadable contents, a providing situation storage part that stores a providing situation of the contents that content processing apparatus provided to other apparatuses, a priority order determining part determining the priority order of download in the extracted undownloaded contents based on the providing situation stored in the providing situation storage part, and a downloading part downloading the contents in accordance with the priority order determined by the priority order determining part.

18 Claims, 16 Drawing Sheets

FIG. 6

| CONTENT ID | TITLE | PROVISION START DATE AND TIME | DETAILED INFORMATION | FILE NAME | SIZE |
|---|---|---|---|---|---|
| 001 | SECOND GAME OF W SERIES | 2007/10/29 | ... LEAGUE 2008 | MLBWS20071... | 2.28GB |
| 002 | FOURTH COLLECTION OF SILK ROAD | 2007/11/10 | TRIPITAKA OF JOURNEY TO THE WEST | SLKV2S42007... | 1.35GB |
| 003 | BASEBALL TEAM A OF 2008 | 2007/12/15 | WORLD ... 2008 | NLBSP200712... | 1.04GB |
| ... | ... | ... | ... | ... | ... |

| SEARCH KEYWORD | SEARCH REQUEST ORIGIN NODE | SEARCH REQUEST DATE AND TIME | CORRESPONDING CONTENT ID |
|---|---|---|---|
| W SERIES | P | 2007/12/28 21:33:01 | 008, 011, 037 |
| SILK ROAD | R | 2007/12/28 21:36:02 | 008, 037 |
| TEAM A | R | 2007/12/28 21:18:11 | 052, 084 |
| ... | ... | ... | ... |

| CONTENT ID | ACQUISITION REQUEST ORIGIN NODE | ACQUISITION REQUEST DATE AND TIME | TRANSMISSION RATE | ACTUAL TRANSMISSION RECORD |
|---|---|---|---|---|
| 008 | P | 2007/12/28 21:34:14 | 5Mbps | 100% |
| 008 | R | 2007/12/28 21:37:03 | 8Mbps | 100% |
| 037 | Q | 2007/12/29 17:29:39 | 1Mbps | 20% |
| ... | ... | ... | ... | ... |

FIG. 9

| ACQUISITION REQUEST ORIGIN NODE | TRANSMISSION BAND | NUMBER OF Hops |
|---|---|---|
| P | 10Mbps | 1 |
| Q | 12Mbps | 3 |
| R | 24Mbps | 1 |
| ... | ... | ... |

| SEARCH KEYWORD | SEARCH REQUEST DATE AND TIME | POSSESSED NODE |
|---|---|---|
| WORLD CUP | 2007/12/22 11:36:50 | X, Y |
| SILK ROAD | 2007/12/22 13:15:08 | Z |
| TEAM B | 2007/12/22 14:14:45 | X, Z |
| ... | ... | ... |

| CONTENT ID | PROVISION ORIGIN NODE | DL REQUEST DATA AND TIME | TRANSMISSION RATE | ACTUAL TRANSMISSION RECORD |
|---|---|---|---|---|
| 001 | X | 2007/12/22 21:06:18 | 5Mbps | 100% |
| 002 | Z | 2007/12/23 10:54:16 | 9Mbps | 50% |
| 003 | X | 2007/12/27 14:11:16 | 4Mbps | 100% |
| ... | ... | ... | ... | ... |

| PROVISION ORIGIN NODE | TRANSMISSION BAND | NUMBER OF Hops |
|---|---|---|
| X | 5Mbps | 1 |
| Z | 9Mbps | 2 |
| X | 4Mbps | 3 |
| ... | ... | ... |

FIG. 13

| CONTENT ID | VIEWING DATE AND TIME | ACTUAL VIEWING RECORD | NUMBER OF TIMES OF VIEWING | DELETION DATE AND TIME |
|---|---|---|---|---|
| 001 | 2007/12/23 10:06:34 | 100 % | 4 | 2007/12/28 14:12:35 |
| 002 | 2008/01/04 20:39:28 | 3 % | 1 | — |
| 003 | — | 0 % | 0 | 2007/12/28 14:11:09 |
| ... | ... | ... | ... | ... |

204

CONTENT PROCESSING APPARATUS, CONTENT PROCESSING METHOD, AND RECORDING MEDIUM

CROSS-REFERENCE TO RELATED APPLICATIONS

This application is based upon and claims the benefit of priority of the prior on Japanese Patent Application No. 2008-191566, filed on Jul. 25, 2008, the entire contents of which are incorporated herein by reference.

FIELD

The embodiments discussed herein are related to a content processing apparatus, a content processing method, and a computer-readable recording medium storing a content processing program.

BACKGROUND

In recent years, a P2P (Peer to Peer) system has been generally known, in which a plurality of unspecified computers are connected to each other through a network and directly transmit and receive contents.

In this system, a time that is expended to download the contents means a waiting time for a user. In particular, file sizes of the contents, such as moving pictures, are generally large. A time that is expended for the user to view the contents significantly decreases the user's convenience.

As a method of increasing a user's convenience, there is a method in which contents are downloaded in advance (before the user views the contents). For example, according to a method discussed in Japanese Unexamined Patent Application No. 2007-104656, an HTTP (HyperText Transfer Protocol) proxy server exchanges a function of intermediating download requests from a plurality of users, caches the contents that are already downloaded and exchanged to another user, and exchanges the caches according to the download requests from the users, thereby shortening a download time.

According to Japanese Unexamined Patent Application No. 2006-325011, a technology is discussed for downloading contents of a Web site of a cyclic object registered in advance by a user in an available time and using the downloaded contents when the contents are actually used.

Further, the following method has been known. In a P2P network, among a plurality of existing nodes of download destinations, a node where contents can be downloaded in a short time is selected on the basis of path and band information of the network or a load situation of the node, and the contents are downloaded from the selected node.

However, since there is a limitation in a capacity of a storage area where contents are accumulated or a network band occupied to download the contents in advance, the storage capacity or the network band may be wasted if unnecessary contents are also downloaded in advance. As a result, efficiencies of the storage capacity and the network band are deteriorated.

Further, when the node of the download destination in the P2P network is selected, an effect of shortening a download time for an individual content is obtained. However, since it is not determined whether the individual contents are necessary or unnecessary, the unnecessary contents may be downloaded.

SUMMARY

A content processing apparatus that exchanges contents with other apparatuses. The content processing apparatus includes an extracting part that extracts undownloaded contents from a list of downloadable contents, a providing situation storage part that stores a providing situation of the contents that content processing apparatus provided to other apparatuses, a priority order determining part that determines the priority order of the undownloaded contents that are extracted by the extracting part based on the provision situation that is stored in the providing situation storage part, and a downloading part that downloads the contents in accordance with the priority order determined by the priority order determining part.

A method for a content processing apparatus that exchanges contents with other apparatuses via a network including extracting undownloaded contents from a list of downloadable contents, storing a providing situation where the contents are exchanged to other apparatuses, determining the priority order of undownloaded contents that are extracted at extracting based on the stored providing situation, and downloading the contents in accordance with the priority order determined by the determining.

The object and advantages of the embodiments discussed herein will be realized and attained by means of elements and combinations particularly pointed out in the claims.

It is to be understood that both the foregoing general description and the following detailed and the following detailed description are exemplary and only are not restrictive exemplary explanatory are not restrictive of the invention, as claimed.

BRIEF DESCRIPTION OF THE DRAWINGS

FIG. 6 is a diagram depicting an example of information stored in a management information storage part;

FIG. 7 is a diagram depicting an example of information stored in a providing situation storage part;

FIG. 8 is a diagram depicting an example of information stored in a providing situation storage part;

FIG. 9 is a diagram depicting an example of information stored in a providing situation storage part;

FIG. 10 is a diagram depicting an example of information stored in a utilized situation storage part;

FIG. 11 is a diagram depicting an example of information stored in a utilized situation storage part;

FIG. 12 is a diagram depicting an example of information stored in a utilized situation storage part;

FIG. 13 is a diagram depicting an example of information stored in a utilized situation storage part;

DETAILED DESCRIPTION OF THE EMBODIMENTS

Figure 1:
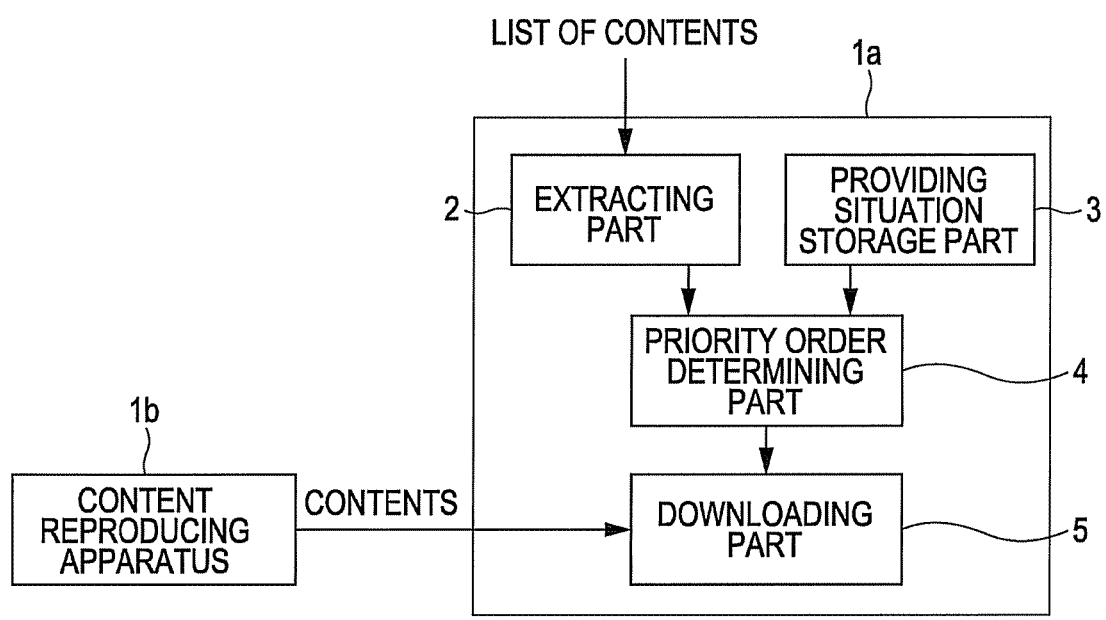
FIG. 1 is a diagram depicting an example of the outline of a content processing apparatus according to an embodiment.

Reference will now be made in detail to the embodiments, examples of which are illustrated in the accompanying drawings, wherein like reference numerals refer to the like elements throughout. The embodiments are described below to explain by referring to the figures.

According to embodiments of a content processing apparatus disclosed herein, desired contents can be efficiently downloaded.

First, after a content processing apparatus according to an embodiment is described, the embodiment will be specifically described. FIG. 1 is a diagram depicting an example of the outline of a content processing apparatus according to the embodiment. A content processing apparatus 1a includes an extracting part 2, a providing situation storage part 3, a priority order determining part 4, and a downloading part 5.

The extracting part 2 extracts undownloaded contents from a list of downloadable contents that are obtained from a user via input interface such as a keyboard.

The providing situation storage part 3 stores a providing situation of contents that are exchanged to another content processing apparatus. The providing situation includes information to identify a content processing apparatus of a providing destination, a transmission rate at time of exchanging contents, and a ratio of the transmitted contents (whether all of the contents are transmitted or only a portion of the contents is transmitted).

The priority order determining part 4 determines the priority order of download of the undownloaded contents that are extracted by the extracting part 2 based on the providing situation stored in the providing situation storage part 3. For example, the priority order determining part 4 executes a process of raising the priority order, as compared to the case in which a transmission rate is high with the case in which a transmission rate is low. Further, in the case in which the number of content processing apparatuses that pass through the content processing apparatus of the download destination is large, the priority order determining part 4 executes a process to lower the priority order, as compared with the case in which the number of content processing apparatuses is small.

The downloading part 5 downloads contents from another content processing apparatus 1b in accordance with the priority order determined by the priority order determining part 4. At this time, the downloading part 5 may also consider a content storage capacity of the content processing apparatus 1a.

The content processing apparatus 1a adds a providing situation to another node and performs download. As a result, the contents where availability is high in another content processing apparatus at a relatively neighboring position are downloaded to the corresponding content processing apparatus 1a. Accordingly, as viewed from another content processing apparatus, the possibility that contents that are in a high download environment are downloaded to the neighboring content processing apparatus becomes high. As a result, a time required for download can be decreased.

Hereinafter, an embodiment will be specifically described.

Figure 2:
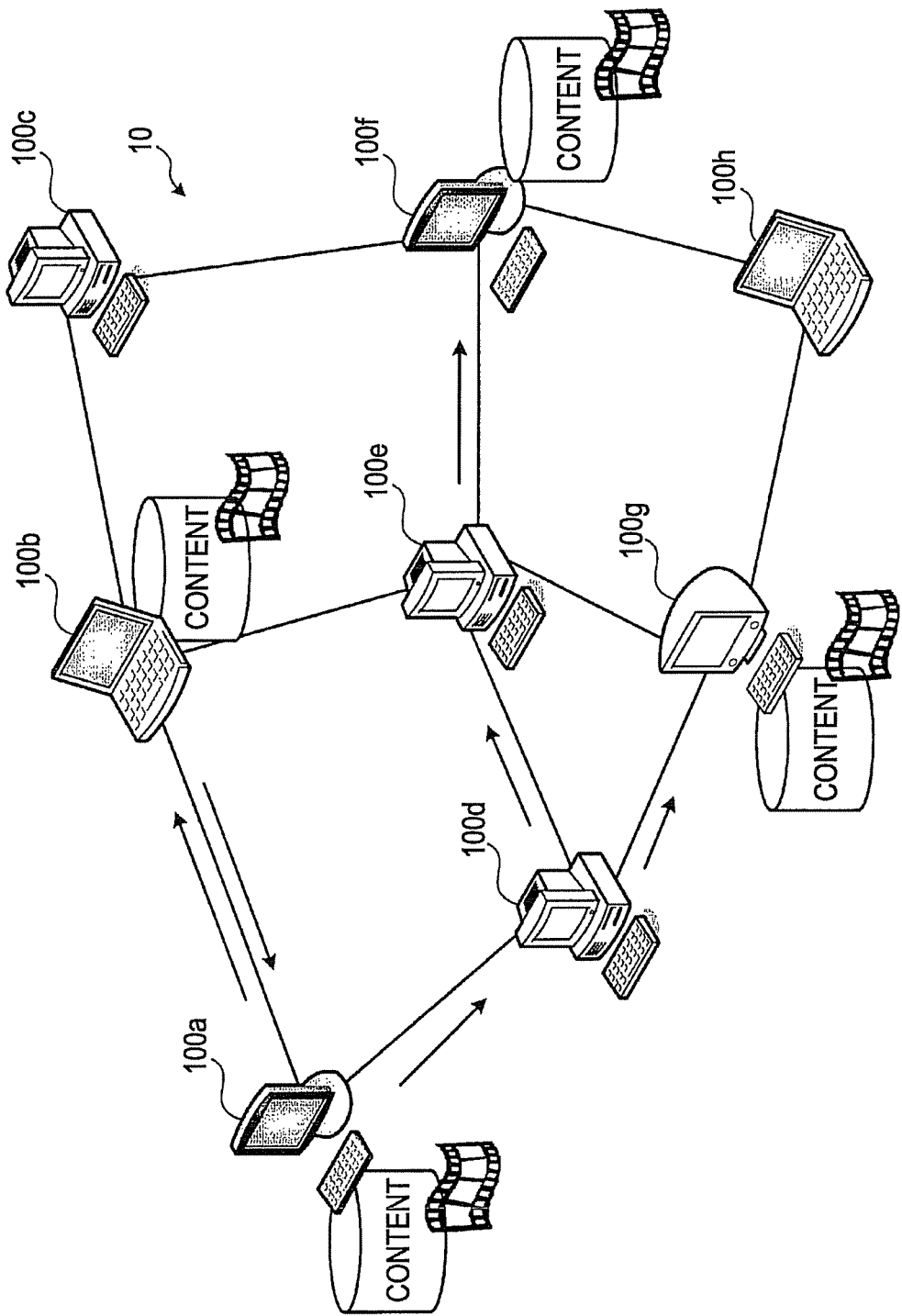
FIG. 2 is a diagram depicting an example of a system according to an embodiment.

FIG. 2 is a diagram depicting an example of a system according to an embodiment.

The system according to this embodiment includes a plurality of nodes (content processing apparatuses) 100a to 100h. Each of the nodes 100a to 100h is connected to a P2P network 10. Each of the nodes 100a to 100h functions as a client or a server with respect to another node on the P2P network 10.

Specifically, each of the nodes 100a to 100h has a function of searching for contents from the nodes through the P2P network 10, downloading the searched contents, and accumulating the downloaded contents in a local disk. In FIG. 2, the nodes 100a, 100b, 100f, and 100g accumulate the contents in the local disk.

In regards to the contents accumulated in the local disk, a user can view the contents on the node that includes the corresponding local disk.

Further, the node, which has received a search request from another node, searches for the contents that are accumulated in the local disk. The node returns a search result as a response. Further, if the node receives a content download request from another node, the node exchanges the corresponding content.

Figure 3:
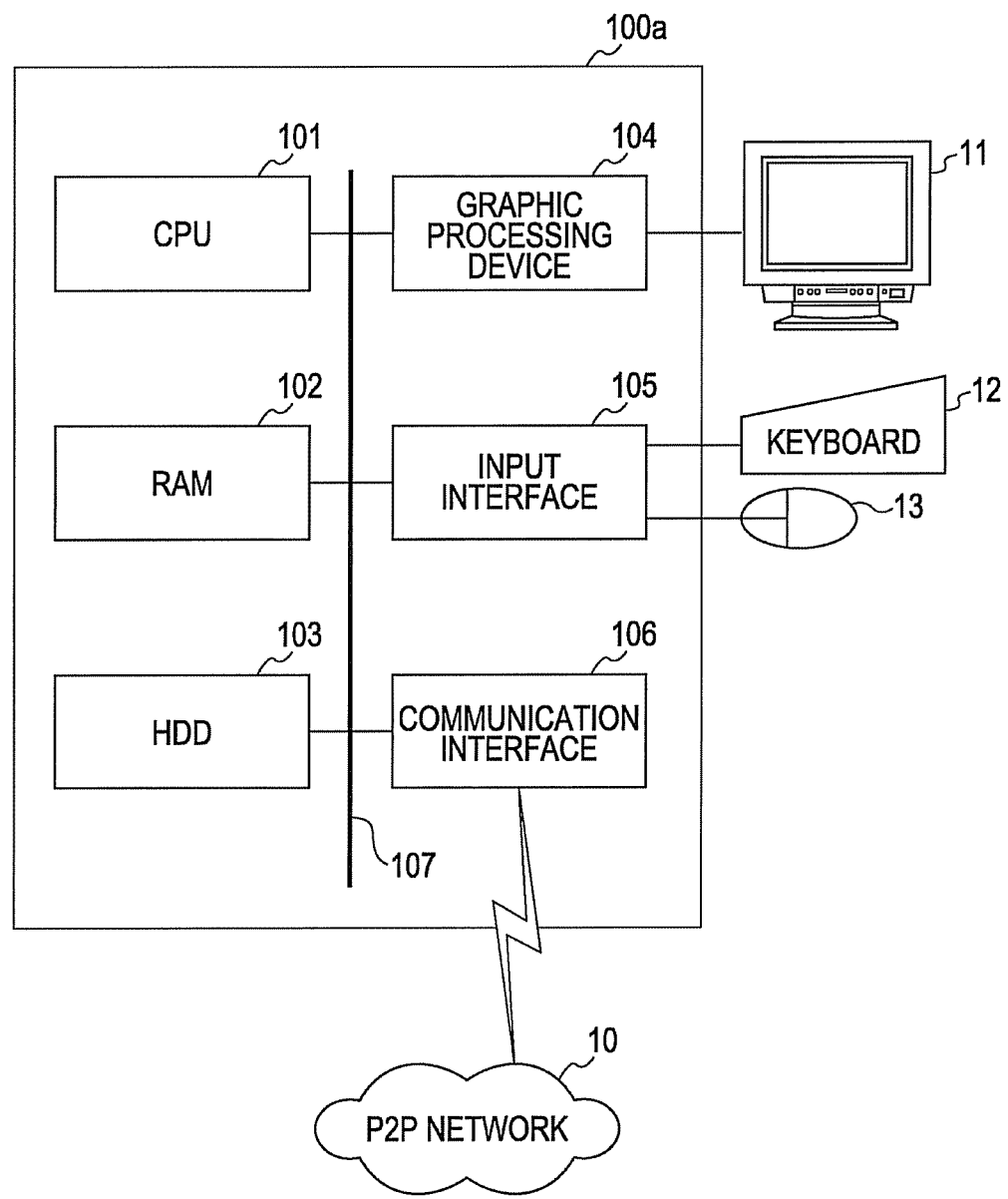
FIG. 3 is a diagram depicting an example of the hardware configuration of a node.

FIG. 3 is a diagram depicting an example of the hardware configuration of a node.

The node 100a is wholly controlled by a CPU (Central Processing Unit) 101. The CPU 101 is connected to a RAM (Random Access Memory) 102, an HDD (Hard Disk Drive) 103, a graphic processing device 104, an input interface 105, and a communication interface 106 through a bus 107.

The RAM 102 temporarily stores at least a portion of an application program or a program of an OS (Operating System) executed by the CPU 101. Further, the RAM 102 stores a variety of data used for a process by the CPU 101. The HDD 103 stores the OS or the application program. Further, the HDD 103 stores program files or contents.

The graphic processing device 104 is connected to a monitor 11. The graphic processing device 104 displays an image on a screen of the monitor 11 in accordance with a command from the CPU 101. The input interface 105 is connected to a keyboard 12 and a mouse 13. The input interface 105 transmits a signal, which is transmitted from the keyboard 12 or the mouse 13, to the CPU 101 through the bus 107.

The communication interface 106 is connected to the P2P network 10. The communication interface 106 transmits and receives data between the other nodes 100b to 100h, through the P2P network 10.

By including the above hardware configuration, this embodiment can realize a processing function. FIG. 3 depicts an example of the hardware configuration of the node 100a. However, nodes including a hardware configuration the same as the node 100a can be applied to the other nodes 100b to 100h. In the system that includes the above hardware configuration, in order to download the contents in advance, the following function is incorporated in the node 100a.

Figure 4:
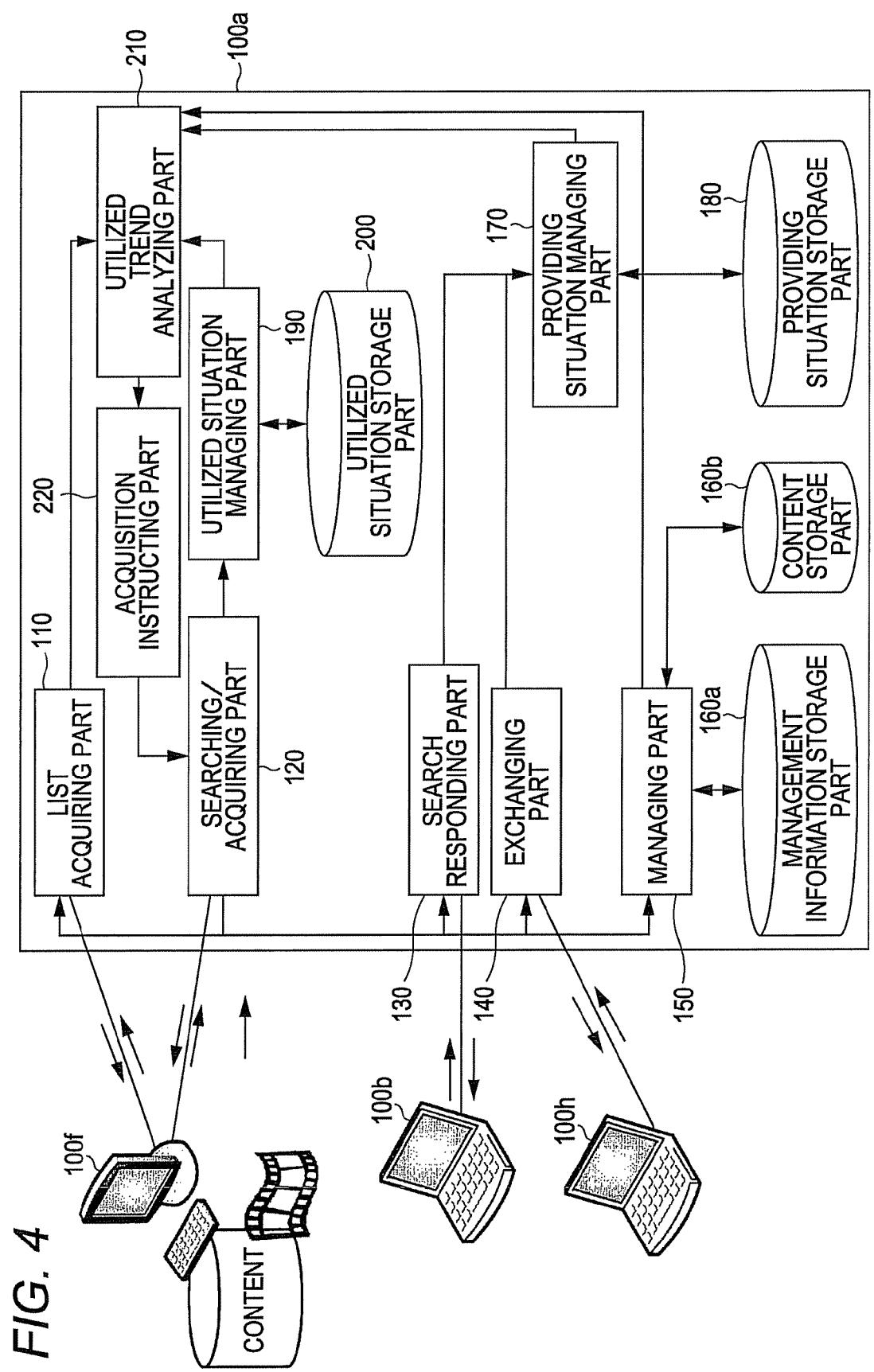
FIG. 4 is a block diagram depicting an example of a function of a node.

FIG. 4 is a block diagram depicting an example of a function of a node. FIG. 4 representatively depicts a function of the node 100a. However, the other nodes 100b to 100h may have the same function as the node 100a.

The node 100a includes a list acquiring part 110, a searching/acquiring part 120, a search responding part 130, a exchanging part 140, a managing part 150, a management information storage part 160a, a content storage part 160b, a providing situation managing part 170, a providing situation storage part 180, a utilized situation managing part 190, a utilized situation storage part 200, a utilized trend analyzing part 210, and an acquisition instructing part 220.

The list acquiring part 110 transmits a request to acquire a list of contents distributed by a broadcasting station or a content distributor through the P2P network 10, thereby acquiring a list of contents existing on the P2P network 10 from the other nodes 100*b* to 100*h* (node 100*f* in FIG. 4) that possess the contents. The list of contents includes metadata, such as titles of individual contents or detailed information describing the individual contents, which is added to the contents.

Further, the list acquiring part 110 inquires the managing part 150 to receive information of the contents that are stored in the corresponding node 100*a*, and compares the contents and the list of contents, thereby extracting undownloaded contents.

The searching/acquiring part 120 transmits a content search request to the other nodes 100*b* to 100*h* that possess the contents, and acquires a content search result from the node (node 100*f* in FIG. 4) that possesses the contents. In addition, the searching/acquiring part 120 transmits the contents to the utilized situation managing part 190.

Further, the content searching/acquiring part 120 actually acquires the contents in accordance with an instruction from the content acquisition instructing part 220, and transmits the acquired contents to the content managing part 150.

The search responding part 130 responds to a content search request from the other nodes 100*b* to 100*h* (node 100*b* in FIG. 4) that exist on the P2P network 10. Specifically, the search responding part 130 notifies the managing part 150 of a search request for a list of contents. In addition, if the search responding part 130 receives a search result of the list of contents from the managing part 150, the search responding part 130 returns the corresponding contents to the node 100*b* that becomes a search request transmission origin.

The exchanging part 140 exchanges contents in accordance with a content download request from the other nodes 100*b* to 100*h* (node 100*h* in FIG. 4) that exist on the P2P network 10. Specifically, the exchanging part 140 notifies the managing part 150 of content download being requested. In addition, if the exchanging part 140 receives the corresponding contents from the managing part 150, the exchanging part 140 transmits the corresponding contents to the node 100*h* that becomes the content request origin.

The managing part 150 manages possessed contents. Specifically, if the managing part 150 receives an inquiry from the list acquiring part 110, the managing part 150 refers to the management information storage part 160*a*, and returns information of the contents that corresponding node 100*a* stores. Further, if the managing part 150 receives a content search result from the searching/acquiring part 120, the managing part 150 stores the search result in the management information storage part 160*a*. Further, a process of when a content search request is received from the search responding part 130 and a process of when a notification of a download request from the exchanging part 140 is received will be described in detail later.

The management information storage part 160*a* stores content management information that is used when the managing part 150 manages contents, for example, metadata such as titles or detailed address information added to individual contents stored in the storage part 160*b*.

The storage part 160*b* stores the contents. The providing situation managing part 170 collects information related to content providing to the other nodes 100*b* to 100*h* and manages the collected information. Specifically, if the providing situation managing part 170 receives information (which will be described in detail below) from the search responding part 130 or the exchanging part 140, the providing situation managing part 170 stores the received information in the providing situation storage part 180. Further, the providing situation managing part 170 notifies the utilized trend analyzing part 210 of a message indicating that new information is stored in the providing situation storage part 180.

The providing situation storage part 180 stores a variety of information that is used when the providing situation managing part 170 manages a content providing situation. Specifically, the providing situation storage part 180 stores information related to the content search request received by the search responding part 130, information related to the contents exchanged by the exchanging part 140, and information related to the node of the providing destination exchanged by the exchanging part 140.

The utilized situation managing part 190 collects a utilized situation in the node 100*a* and manages the collected content utilized situation. Specifically, if the utilized situation managing part 190 receives information (which will be described in detail below) from the searching/acquiring part 120, the utilized situation managing part 190 stores the received information in the utilized situation storage part 200. Further, the utilized situation managing part 190 notifies the utilized trend analyzing part 210 of a message indicating that new information is stored in the utilized situation storage part 200.

The utilized situation storage part 200 stores a variety of information that is used when the utilized situation managing part 190 manages a utilized situation. Specifically, the utilized situation storage part 200 stores information related to a search that a user using the node 100*a* has performed to search for the contents existing in the other nodes 100*b* to 100*h* and a search result, information related to a situation of when the searching/acquiring part 120 actually acquires (downloads) the contents existing in the other nodes 100*b* to 100*h*, and information related to the node that becomes a content providing origin.

The utilized trend analyzing part 210 receives a notification from the above-described providing situation managing part 170 or the utilized situation managing part 190 and executes the following process (previous download process).

The utilized trend analyzing part 210 collects a utilized situation of the user related to the downloaded contents or a providing situation to the other nodes. In addition, the utilized trend analyzing part 210 calculates the priority order of download with respect to undownloaded contents, in consideration of similarity of metadata of the undownloaded contents from the utilized situation, and the utilized situation and the providing situation.

In accordance with the priority order calculated by the utilized trend analyzing part 210, the acquisition instructing part 220 transmits a download instruction to the searching/acquiring part 120, in the order of the contents having the high priority order. At this time, the acquisition instructing part 220 may transmit an instruction to download only the contents having the priority order of a given value or more to the searching/acquiring part 120.

Figure 5:
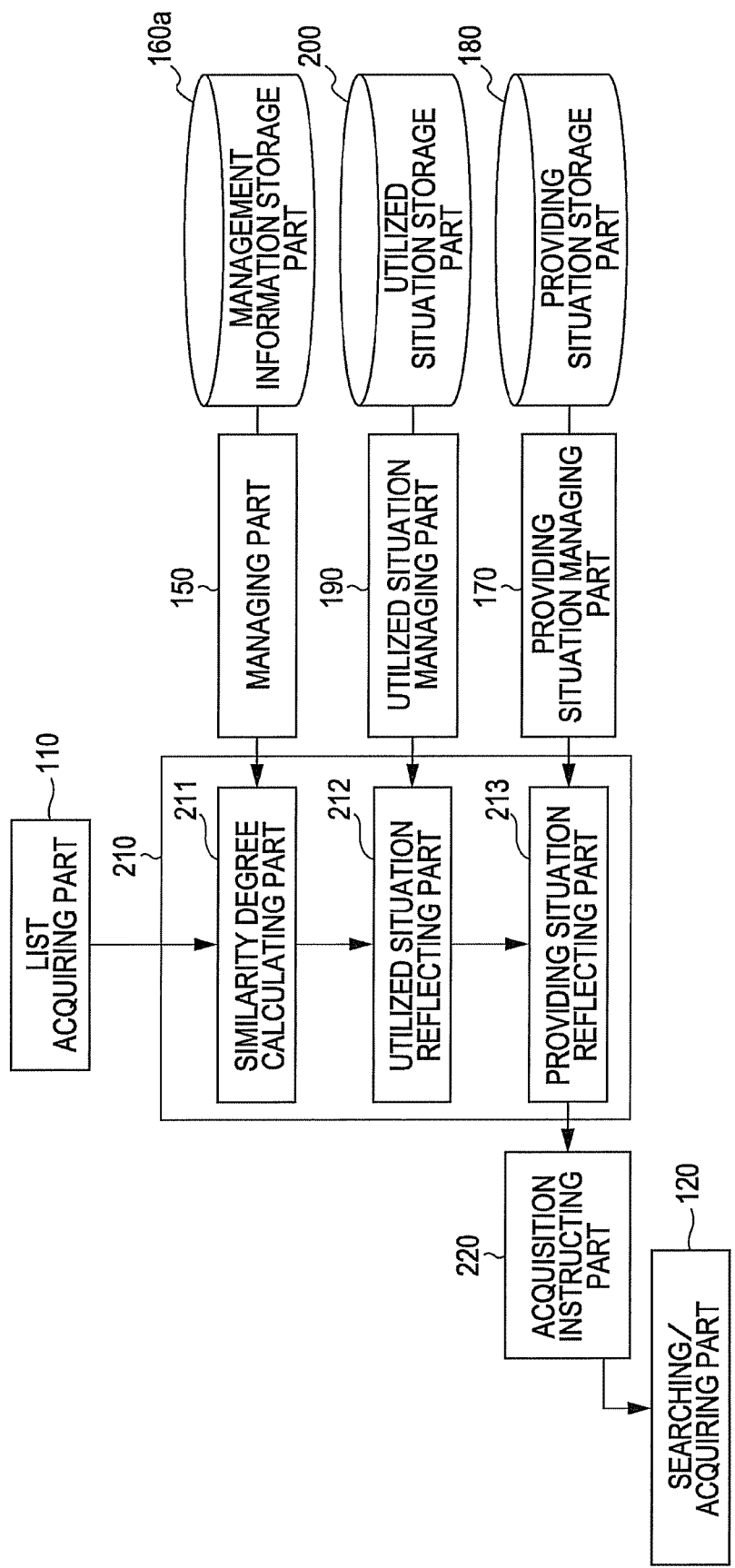
FIG. 5 is a block diagram depicting an example of a function of a utilized trend analyzing part.

Next, a function of the utilized trend analyzing part 210 will be described in detail. FIG. 5 is a block diagram depicting an example of a function of a utilized trend analyzing part. The utilized trend analyzing part 210 includes a similarity degree calculating part 211, a utilized situation reflecting part 212, and a providing situation reflecting part 213.

The similarity degree calculating part 211 calculates a similarity degree with the contents stored in the storage part 160*b* for each of the undownloaded contents acquired from the list acquiring part 110.

When the similarity degree is calculated, various methods may be applied. However, the similarity degree may be calculated on the basis of a degree to which the same keyword is included in the metadata of content management information. The utilized situation reflecting part 212 reflects on the similarity degree calculated by the similarity degree calculating part 211 a utilized situation of the user with respect to the contents that are determined as being similar to the stored contents (for example, having a similarity degree of a given value or more).

For example, the contents entirely viewed or repetitively viewed by the user are set to have the high priority order. In contrast, the contents partially viewed or not viewed at all by the user and deleted are set to have the low priority order.

The providing situation reflecting part 213 further reflects, on the similarity degree on which the utilized situation is reflected by the utilized situation reflecting part 212, a providing situation with respect to the contents that are determined as being similar to the stored contents. For example, the contents exchanged in accordance with the download requests from the other nodes 100b to 100h are set to have the high priority order.

Further, in addition to increasing or decreasing a value in a providing frequency, information of a network path until the node of the providing destination is also added. Specifically, in the case of providing to the node where resources needed for transmission are decreased on the basis of the number of hops or a communication band with the node of the providing destination, the priority order becomes high.

Further, the providing situation reflecting part 213 further reflects, on the similarity degree on which the providing situation is reflected, a search response situation with respect to the contents that are determined as being similar to the stored contents. For example, when a keyword included in the content search requests from the other nodes 100b to 100h is included in metadata, a undownloaded content including the corresponding keyword is set to have the high priority degree.

Further, if the keyword included in the content search requests from the other nodes 100b to 100h is included in metadata of an individual content within the list of contents, (even though the corresponding content is not included in the storage part 160b), a content including the corresponding keyword may be set to have the high priority order.

A value increased or decreased by reflecting the utilized situation and the providing situation on the similarity degree using the above-described method is used as a recommendation degree related to previous content download.

Next, information stored in each storage part will be described. FIG. 6 is a diagram depicting an example of information stored in a management information storage part. In the management information storage part 160a, a small amount of information associated with each other is stored in a form of a table. The content management information managing table 161 is exchanged with columns of a content ID, a title, a providing start date and time, detailed information, a file name, and a size. In the management information managing table 161, information arranged in a horizontal direction of each column is associated with each other.

In the content ID column of the table 161, a figure used to uniquely identify content management information is set. In the title column of the table 161, titles used when the user identifies the contents are stored.

In the providing start date and time column of the table 161, a date and time when the contents start to be exchanged is stored. In the detailed information column of the table 161, metadata that is added to the contents stored in the storage part 160b is stored. The metadata is used when the user confirms the contents or the searching/acquiring part 120 searches a keyword. In addition, the metadata is also used when the similarity degree is calculated.

In the file name column of the table 161, information that is needed when the nodes 100a to 100h identify the contents is stored. In the size column of the table 161, a capacity of the contents is stored.

FIGS. 7 to 9 are diagrams depicting examples of information stored in a providing situation storage part. In the providing situation storage part 180, information is arranged in a form of a table and stored.

The search response situation management table 181 depicted in FIG. 7 is a table in which information related to the search request received by the search responding part 130 is managed. The search response situation management table 181 is exchanged with columns of a search keyword, a search request origin node, a search request date and time, and a corresponding content ID. In the search response situation management table 181, information arranged in a horizontal direction of each column is associated with each other.

In the search keyword column of the table 181, a keyword included in the content search request, that is, a keyword input by the user using the other nodes 100b to 100h in order to search for contents is stored.

In the search request origin node column of the table 181, information necessary to identify the node that has output the search request is stored. In the search request date and time column of the table 181, a date and time when the search responding part 130 receives the search request is stored.

In the corresponding content ID column of the table 181, a content ID of a content that has metadata including the search keyword is stored. The providing situation management table 182 depicted in FIG. 8 is a table in which information related to the contents exchanged by the exchanging part 140 is managed.

The providing situation management table 182 is exchanged with columns of a content ID, an acquisition request origin node, an acquisition request date and time, a transmission rate, and an actual transmission record. In the providing situation management table 182, information arranged in a horizontal direction of each column is associated with each other.

In the content ID column of the table 182, a content ID of a exchanged content is stored. In the acquisition request origin node column of the table 182, information necessary to identify the node that has output an acquisition request is stored.

In the acquisition request date and time column of the table 182, a date and time when the exchanging part 140 has received the acquisition request is stored. In the transmission rate column of the table 182, a transmission rate of when the content is transmitted to the node that has output the acquisition request is stored.

In the actual transmission record column of the table 182, a ratio of contents transmitted to the node that has output the acquisition request is stored. The acquisition request origin node information management table 183 depicted in FIG. 9 is a table in which information related to the node of the providing destination exchanged by the exchanging part 140 is managed.

The acquisition request origin node information management table 183 is exchanged with columns of an acquisition request origin node, a transmission band, and the number of hops. In the acquisition request origin node information management table 183, information arranged in a horizontal direction of each column is associated with each other.

In the acquisition request origin node column of the table 183, the same information as that in the acquisition request origin node column of the providing situation management table 182 is stored. In the transmission band column of the table 183, a band where the corresponding node can be transmitted is stored.

In the number of hops column of the table 183, the number of other nodes (number of hops) that pass through the acquisition request origin node viewed from the node 100a is stored.

FIGS. 10 to 13 are diagrams depicting an example of information stored in a utilized situation storage part.

The utilized situation storage part 200 stores information arranged in a form of a table. The search information management table 201 that is depicted in FIG. 10 is a table to manage information related to a search that a user using the node 100a has performed in order to search for the contents existing in the other nodes 100b to 100h and a search result.

The search information management table 201 is exchanged with columns of a search keyword, a search request date and time, and a possessed node. In the search information management table 201, information arranged in a horizontal direction of each column is associated with each other.

In the search keyword column of the table 201, a keyword input by the user using the node 100a in order to search for the contents existing in the other nodes 100b to 100h is stored.

In the search request date and time column of the table 201, a date and time when the content searching/acquiring part 120 transmits a search request is stored. In the possessed node column of the table 201, the node that has responded as a message indicating "possessing contents" with respect to a content search request based on the keyword in the search keyword column is stored.

The acquisition situation management table 202 depicted in FIG. 11 is a table to manage information related to a situation of when the searching/acquiring part 120 actually acquires (downloads) the contents existing in the other nodes 100b to 100h.

The acquisition situation management table 202 is exchanged with columns of a content ID, a providing origin ID, a DL request date and time, a transmission rate, and an actual transmission record. In the acquisition situation management table 202, information arranged in a horizontal direction of each column is associated with each other.

In the content ID column of the table 202, information that is needed to identify the acquired content is stored. In the providing origin node column of the table 202, information that is used to identify the node that has exchanged the content to the node 100a is stored.

In the DL request date and time column of the table 202, a date and time when the node 100a requests to download the corresponding content is stored. In the transmission rate column, a transmission rate of when the corresponding content is downloaded is stored.

In the actual transmission record column of the table 202, an actual transmission record (%) of when the corresponding contents are downloaded is stored. For example, when all of the corresponding contents are downloaded, an actual transmission record of "100%" is stored. Further, when the corresponding contents are half downloaded, an actual transmission record of "50%" is stored.

The providing origin node information management table 203 depicted in FIG. 12 is a table in which information related to the node of the content providing origin is managed. The providing origin node information management table 203 is exchanged with columns of a providing origin node, a transmission band, and the number of hops. In the providing origin node information management table 203, information arranged in a horizontal direction of each column is associated with each other.

In the providing origin node column of the table 203, information that is used to identify the node that has exchanged the content to the node 100a is stored. In the transmission band column of the table 203, a transmission band of the providing origin node is stored.

In the column of the number of hops of the table 203, the number of other nodes that pass trough the providing origin node is stored. The utilized situation management table 204 depicted in FIG. 13 is exchanged with columns of a content ID, a viewing date and time, an actual viewing record, the number of times of viewing, and a deletion date and time. In the utilized situation management table 204, information arranged in a horizontal direction of each column is associated with each other.

In the content ID column of the table 204, information that is needed to identify the acquired content is stored. In the viewing date and time column of the table 204, a date and time when the corresponding content is viewed is stored. In a column that corresponds to a non-viewed content, no information is stored.

In the actual viewing record column, an actual viewing record (%) of the corresponding content is stored. For example, when all of the corresponding contents are viewed, an actual viewing record of "100%" is stored. Further, when only half the corresponding contents are viewed, an actual viewing record of "50%" is stored.

In the column of the number of times of viewing, the number of times of viewing the corresponding content is stored. In the deletion date and time column, a date and time when the corresponding content is deleted is stored.

Next, a process of each part of the node 100a will be described.

Figure 14:
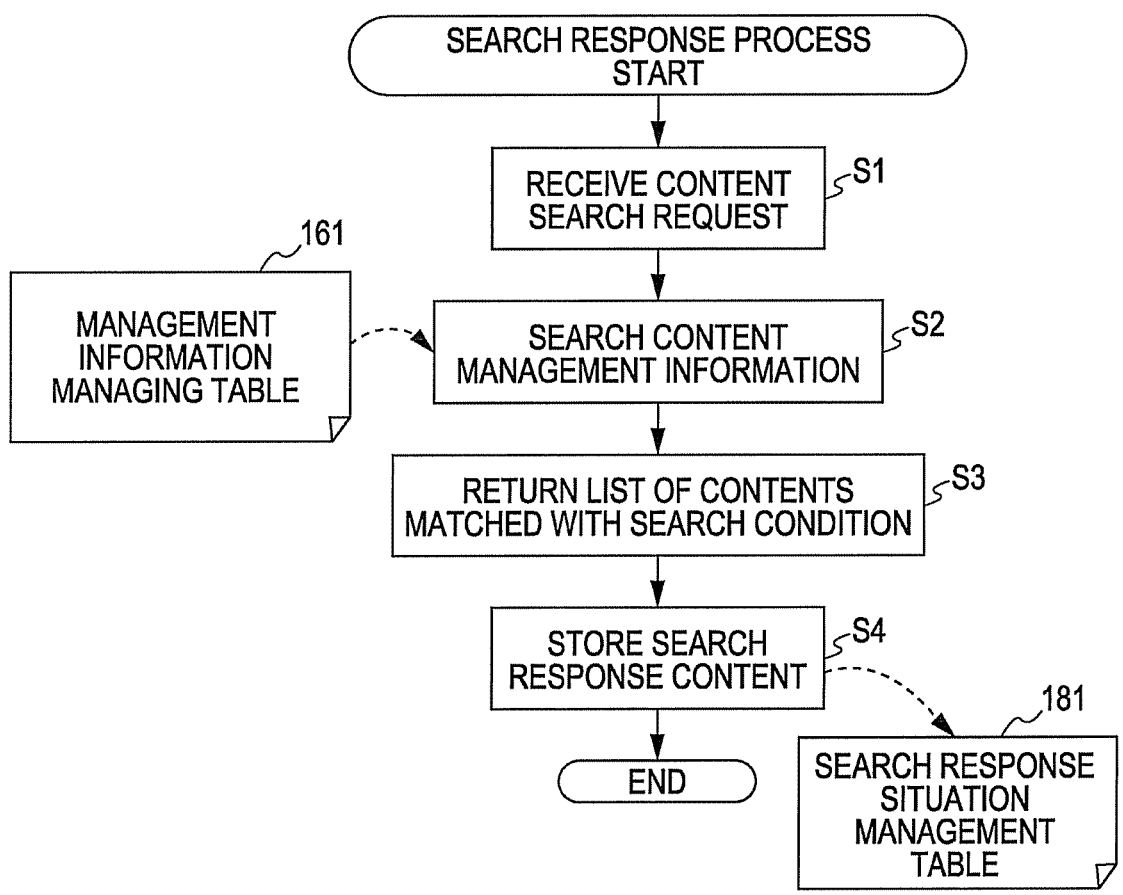
FIG. 14 is an operation chart depicting an example of a search response process.

First, a process (search response process) of when the search responding part 130 receives the content search request will be described. FIG. 14 is an operation chart depicting an example of a search response process.

First, if the search responding part 130 receives a content search request, the search responding part 130 transmits the corresponding search request to the managing part 150 (at operation S1). Next, the managing part 150 searches the management information managing table 161 based on a keyword (search keyword) included in the content search request (at operation S2).

In addition, the managing part 150 returns a list of contents matched with a search condition to the search responding part 130. Thereby, the search responding part 130 returns the list of contents (content ID) as a response to the search request to the node of the search request output origin (at operation S3).

Next, the search responding part 130 transmits the search response contents (the search keyword, the search request origin node, the search request date and time, and the corresponding content ID) to the providing situation managing part 170. Thereby, the providing situation managing part 170 stores the received search response contents in the search response situation management table 181 (at operation S4). The description of the search response process is completed.

Next, a process (providing process) of when the exchanging part 140 receives the download request will be described.

Figure 15:
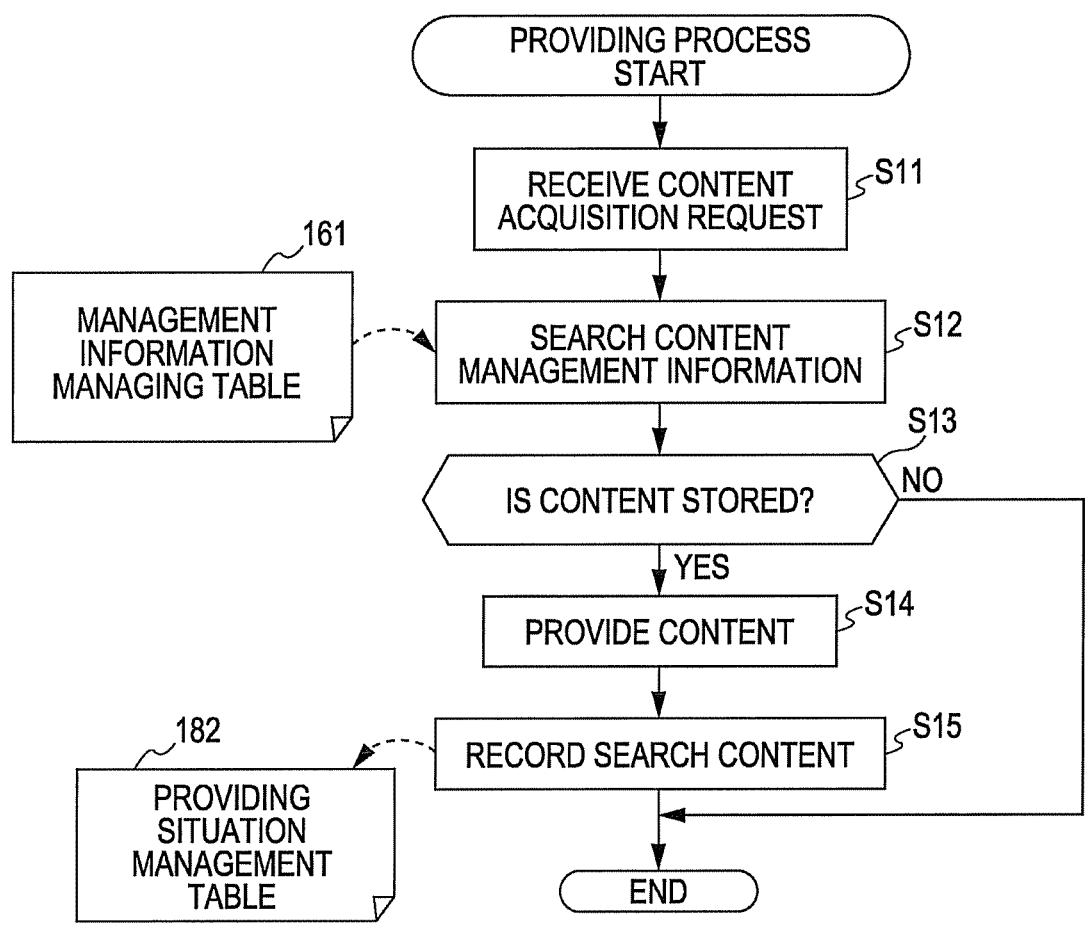
FIG. 15 is an operation chart depicting an example of a content providing process.

FIG. 15 is an operation chart depicting an example of a providing process. First, if the exchanging part 140 receives a content acquisition request, the exchanging part 140 transmits the corresponding acquisition request to the managing part 150 (at operation S11).

Next, the managing part 150 that has received the acquisition request searches the management information managing table 161 based on content ID included in the acquisition request (at operation S12). The managing part 150 determines whether the exchanged contents are stored in the storage part 160*b* (at operation S13).

When it is determined that exchanged contents are not stored (at operation S13: No), the process is completed. Meanwhile, when it is determined that exchanged contents are stored (at operation S13: Yes), the managing part 150 transmits the corresponding contents to the exchanging part 140. The exchanging part 140 that has received the content exchanges the contents to the node that has transmitted the acquisition request (at operation S14).

Then, the exchanging part 140 transmits the exchanged contents (the content ID, the acquisition request origin node, the acquisition request date and time, the transmission rate, and the actual transmission record) to the providing situation managing part 17. Thereby, the providing situation managing part 170 stores the received contents in the providing situation management table 182 (at operation S15). The description of the providing process is completed.

Next, a previous download process will be described.

Figure 16:
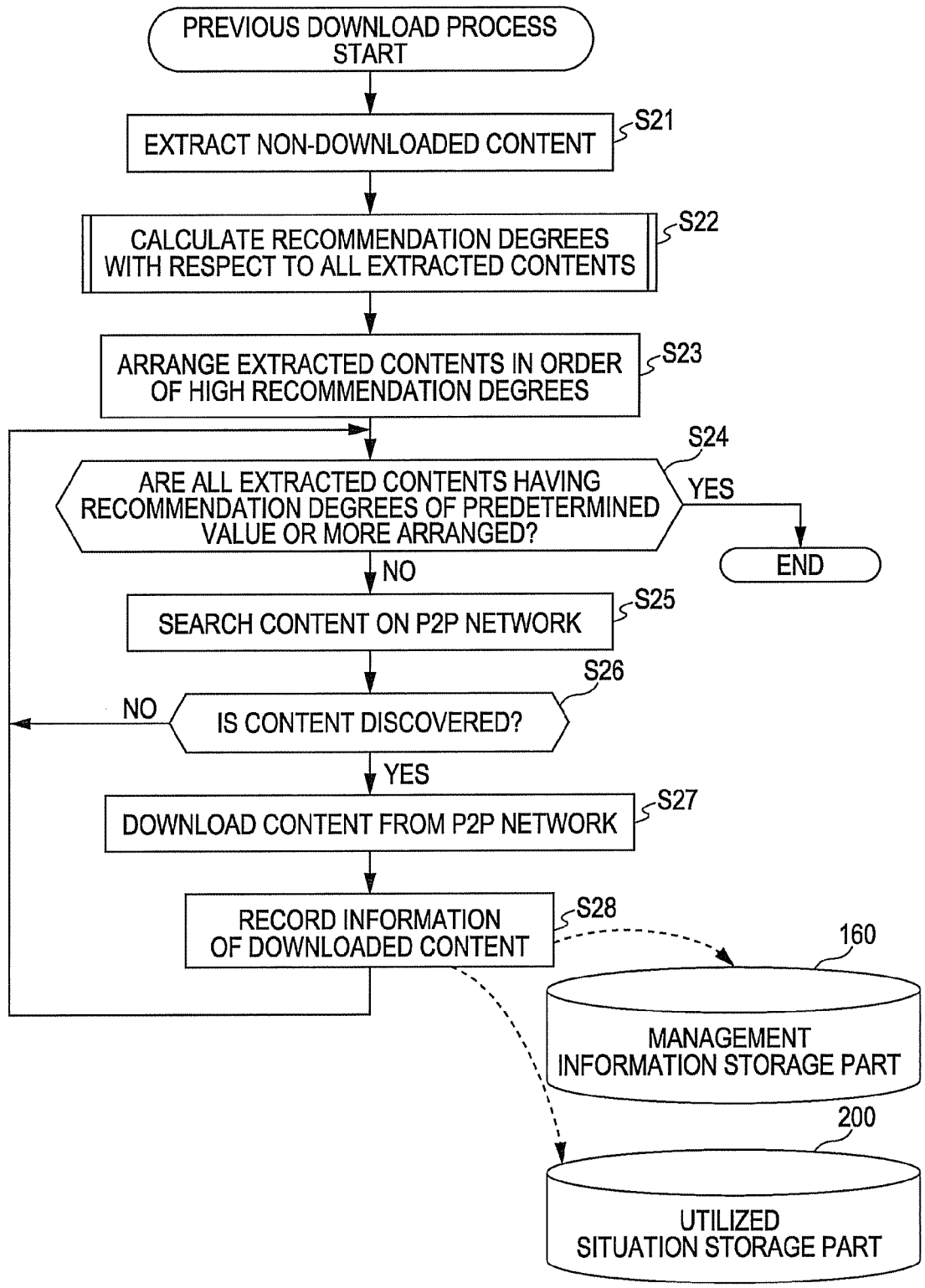
FIG. 16 is an operation chart depicting an example of a previous download process.

FIG. 16 is an operation chart depicting an example of a previous download process. First, the list acquiring part 110 acquires a list of contents. In addition, the list acquiring part 110 extracts undownloaded contents from the acquired list of contents based on the management information managing table 161 (at operation S21).

Next, the utilized trend analyzing part 210 calculates a recommendation degree with respect to all of the extracted of the table 204 undownloaded contents (extracted contents) (at operation S22). Next, the utilized trend analyzing part 210 arranges the extracted contents in the order of the contents having large values at recommended degrees (at operation S23).

Next, it is determined whether all of the extracted contents having the recommended degrees of a given value or more are completely arranged (at operation S24). When the extracted contents are all arranged (at operation S24: Yes), the previous download process is completed.

Meanwhile, when the extracted contents are not all arranged (at operation S24: No), the utilized trend analyzing part 210 searches for contents on the P2P network 10 (at operation S25).

Next, the utilized trend analyzing part 210 determines whether the contents are discovered (at operation S26).

When the contents are not discovered (at operation S26: No), the procedure proceeds to the operation S24, and the utilized trend analyzing part 210 continuously executes the processes starting from the operation S24. When the contents are discovered (at operation S26: Yes), the utilized trend analyzing part 210 downloads the discovered contents from the P2P network 10 (at operation S27).

Next, the utilized trend analyzing part 210 stores information related to the downloaded contents in the management information managing table 161, the providing origin node information management table 203, and the utilized situation management table 204 (at operation S28). Then, the procedure proceeds to the operation S24, and the utilized trend analyzing part 210 continuously executes the processes starting from the operation S24. The description of the previous download process is completed.

Figure 17:
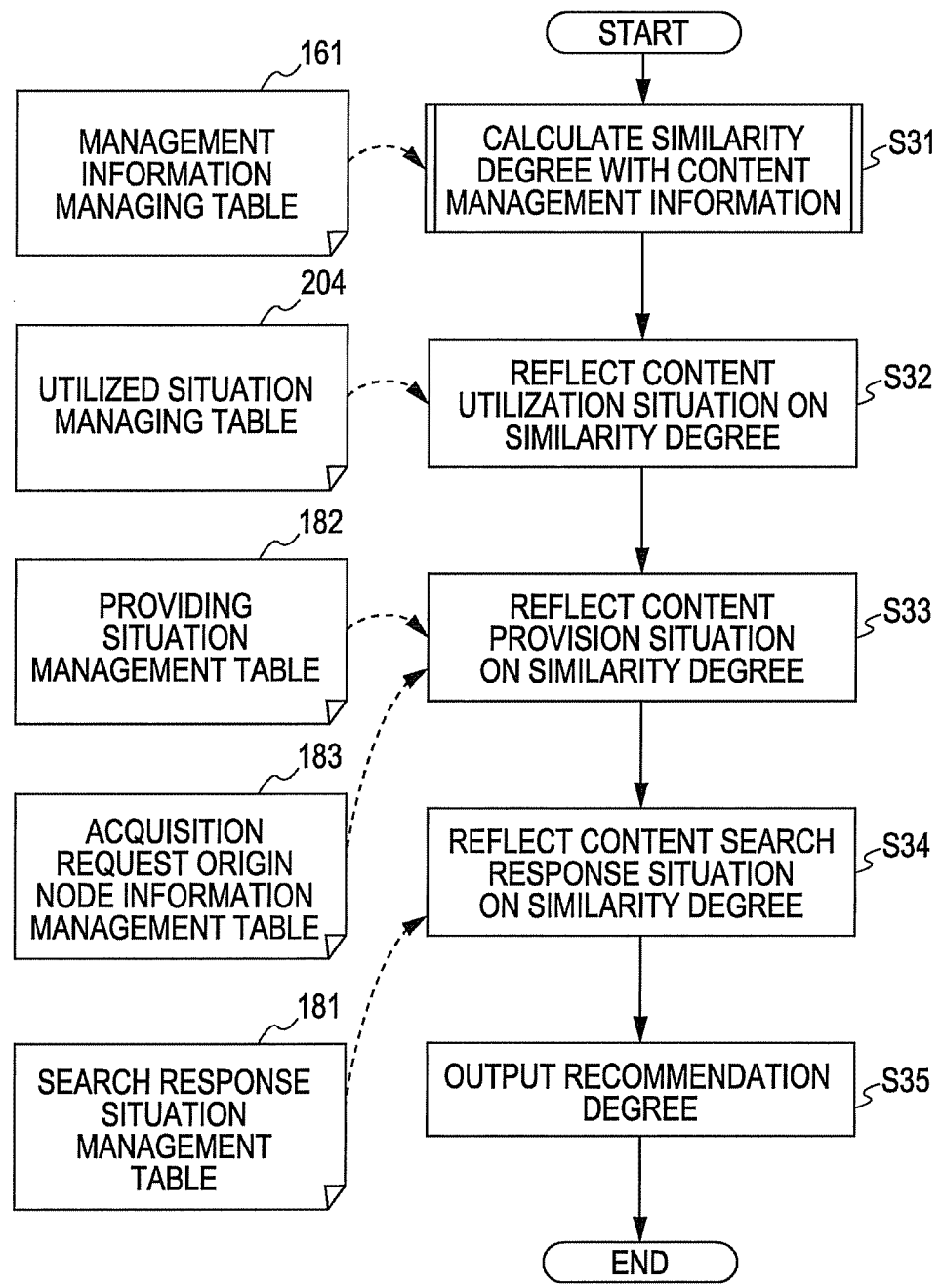
FIG. 17 is an operation chart depicting an example of a recommendation degree calculation process.

Next, a calculation process of a recommended degree in the operation S22 depicted in FIG. 16 will be described. FIG. 17 is an operation chart depicting an example of a recommended degree calculation process.

First, the similarity degree calculating part 211 calculates a similarity degree with an extracted content, for each content management situation (a title and detailed information) that is stored in the management information managing table 161 (at operation S31). Further, a method of calculating the similarity degree will be described in detail below.

Next, the utilized situation reflecting part 212 reflects each content utilized situation, which is stored in the utilized situation management table 204, on the received similarity degree (at operation S32). At this time, the used contents are set to have a similarity degree of a high value, and the currently existing contents are set to have a similarity degree of a high value.

Specifically, with respect to a content that is matched to a content ID, a condition of [similarity degree×(1+actual viewing record ratio)×(1−deletion coefficient)] is set. For example, if an actual viewing record is [100%], an actual viewing record ratio is set as "1," and if a viewing record is [50%], an actual viewing record ratio is set as "0.5." Further, with respect to a deleted content, a deletion coefficient is set as "0.5," and with respect to a non-deleted content, a deletion coefficient is set as "0" (not considered). Further, the number of times of viewing may be reflected on the similarity degree.

Next, the providing situation reflecting part 213 reflects a providing situation of an individual content to the other nodes 100*b* to 100*h*, which is stored in the providing situation management table 182, on the received similarity degree (at operation S33).

At this time, the contents that have the large number of times of providing are set to have a similarity degree of a large value. Specifically, with respect to a content that is matched to a content ID, a condition of [1+sum of ((1/number of hops)× transmission band) for each content providing] is set.

For example, referring to FIGS. 8 and 9, with respect to a content that is matched with a content ID of "008," a condition of $[1+((1/1)\times10)+((1/3)\times12)]$ is satisfied. Further, with respect to a content that is matched with a content ID of "037," a condition of $[1+((1/1)\times24)]$ is satisfied.

Next, the providing situation reflecting part 213 reflects a search response situation of an individual content to the other nodes 100*b* to 100*h*, which is stored in the search response situation management table 181, on the received similarity degree (at operation S34).

At this time, when a search keyword included in the content search request from the other nodes 100*b* to 100*h* is included in the content management information, a content including the corresponding keyword is set to have the high priority degree.

Specifically, the condition of [1+the number of times included in a response to each content search request×a search request coefficient] is set. In this case, the search request coefficient is a value that defines how much information included in the response to the content search request affects the recommended degree, and may be arbitrarily set by the user.

For example, in the search response situation management table 181, since the contents having the content IDs of "008" and "037" are included in search keywords "W series" and "silk road," the number of times included in the response to the content search request becomes "2."

Next, the providing situation reflecting part 213 outputs the obtained value as a recommended degree (at operation S35). The description of the recommended degree calculation process is completed.

In this manner, a recommended degree of each of the undownloaded contents can be calculated by the following equation: $\Sigma$[a similarity degree of metadata with a content in a history×{(1+a viewed ratio at time of each viewing)×(1−deletion coefficient)}×{1+Σ((1/number of hops)×a transmission band) at time of content providing}×{1+the number of times included in a response to each content search request×a search request coefficient}].

Next, a method of calculating the similarity degree at operation S31 will be described.

<First Calculation Process>

Figure 18:
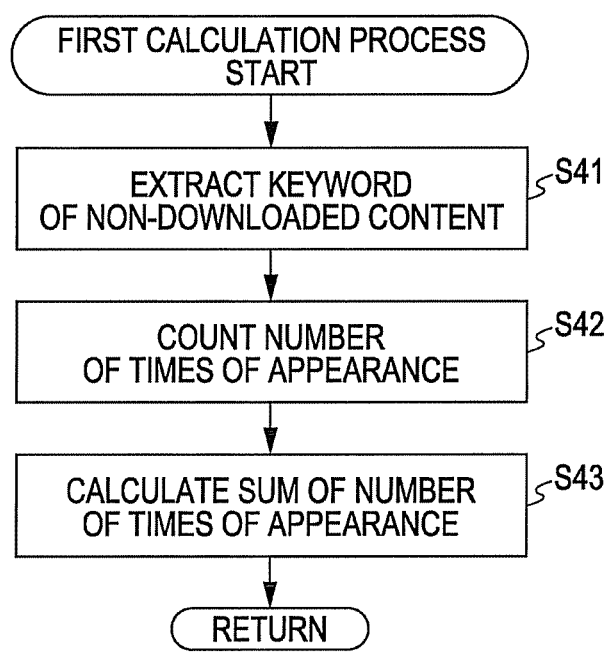
FIG. 18 is an operation chart depicting an example of the first calculation process of a similarity degree.

FIG. 18 is an operation chart depicting an example of a first calculation process of a similarity degree. First, with respect to the undownloaded contents, a keyword included in a title and detailed information is extracted (at operation S41). In a method of extracting the keyword, for example, a process of a "morpheme analysis" of Japanese is executed on a text document, and a morpheme determined as a "noun" is extracted as the keyword.

Next, with respect to each extracted keyword, the number of times of appearance of information of each used content in a title and detailed information is counted (at operation S42). In addition, a sum of the number of times of appearance with respect to all of the extracted keywords is calculated (at operation S43), and is used as a similarity degree between the undownloaded content and the used content. Thereby, when a large amount of the same keywords are included between the undownloaded content and the used content, a sum of the number of times of appearance has a large value. As a result, the similarity degree comes to have a large value. The description of the first calculation process of the similarity degree is completed.

<Second Calculation Process>

Figure 19:
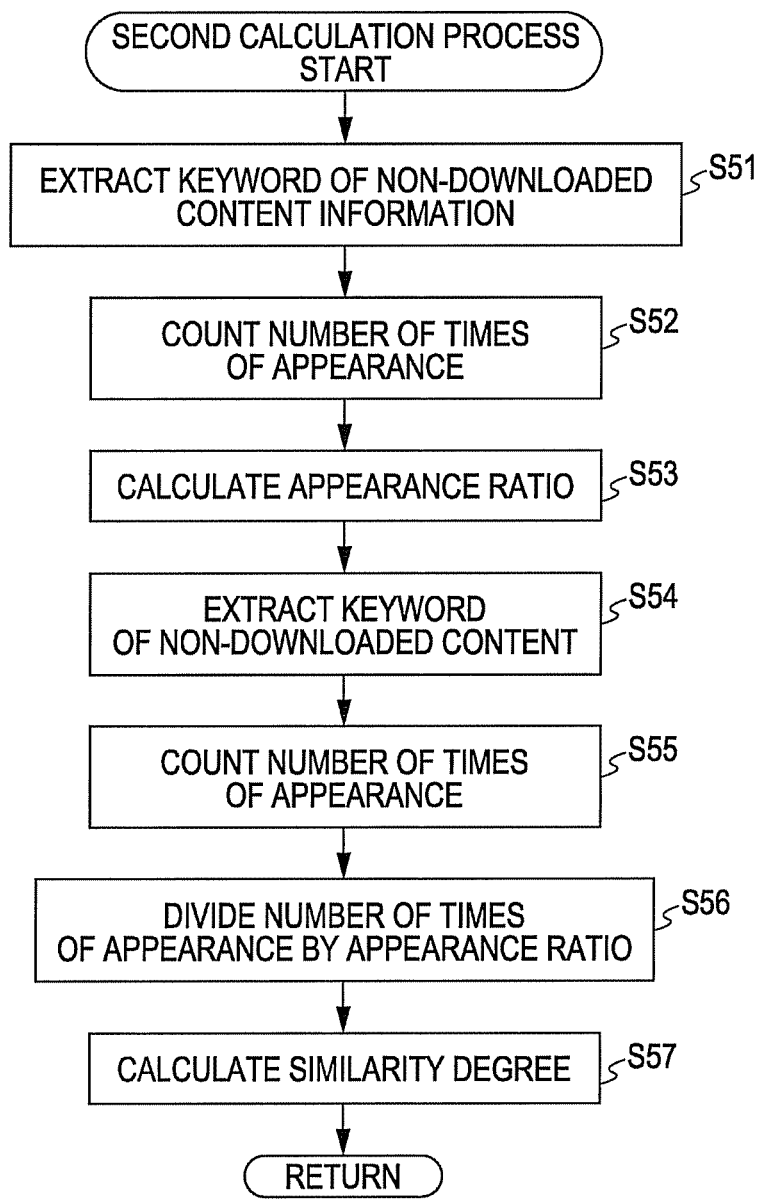
FIG. 19 is an operation chart depicting an example of the second calculation process of a similarity degree.

Next, the second calculation process of a similarity degree will be described. FIG. 19 is an operation chart depicting an example of the second calculation process of a similarity degree. First, with respect to all of the undownloaded contents, all keywords are extracted (at operation S51).

In addition, with respect to each keyword, the number of times of appearance is counted (at operation S52). Next, with respect to each of the extracted keywords, the number of times of appearance is divided by a sum of the number of times of appearance of all of the extracted keywords. In addition, the obtained value is set as an "appearance ratio" of the corresponding keyword (at operation S53). As such, when the number of times of appearance of the keyword is large, the appearance ratio thereof is high.

Next, with respect to the undownloaded contents, keywords included in a title and detailed information is extracted (at operation S54). Next, with respect to each of the extracted keywords, the number of times of appearance of information of each used content in a title and detailed information is counted (at operation S55).

Next, the number of times of appearance that is counted with respect to each of the extracted keyword is divided by an "appearance ratio" of the corresponding keyword (at operation S56). In keywords that have a low appearance ratio, values of division results of the keyword are increased.

Next, a sum of operation results at operation S56 with respect to all of the extracted keywords is calculated, and the calculated value is used as a similarity degree between the undownloaded content and the used content (at operation S57). When a large amount of scarce keywords are shared between the undownloaded contents and the used contents, the similarity degree comes to have a large value. The description of the second calculation process of the similarity degree is completed.

As described above, according to the node 100a of this embodiment, the utilized trend analyzing part 210 calculates a recommended degree where the content providing situations to the other nodes 100b to 100h are added, and the searching/acquiring part 120 downloads the contents on the basis of the recommended degree.

Thereby, the content that may probably be used by other nodes (adjacent nodes) having the relatively small number of hops on the P2P network 10 is downloaded in advance by the node 100a.

Accordingly, when other nodes (nodes 100b and 100d in FIG. 2) use any content, the possibility of the corresponding content being downloaded in the adjacent node 100a is high. Accordingly, it is possible to download the content at a high speed.

In this embodiment, the acquisition instructing part 220 transmits a download instruction to the searching/acquiring part 120 in the order of the contents having the high priority order. However, the present invention is not limited thereto, and the acquisition instructing part 220 may inquire the managing part 150 of a remaining amount of contents that can be stored in the storage part 160b. In addition, when the remaining amount reaches a given value, the acquisition instructing part 220 may wait for a download instruction to the searching/acquiring part 120 or give up downloading.

The content processing apparatus, the content processing method, and the recording media storing the content processing program according to the above-mentioned embodiments have been described with reference to the accompanying drawings. However, the present invention is not limited thereto, and the configuration of each part may be replaced by any configuration having the same function. Further, in the present invention, any other structure or process may be added.

Further, the present invention may include a combination of at least two configurations (characteristics) among the configurations according to the above-described embodiments.

Further, the process functions may be realized by a computer. In this case, a program where process contents of the functions of the nodes 100a to 100h are described is exchanged. If the corresponding program is executed by the computer, the process functions are realized on the computer. The program where the process contents are described can be recorded in a computer-readable recording medium. Examples of the computer-readable recording medium may include a magnetic recording medium, an optical disk, a magneto-optical recording medium, and a semiconductor memory. Examples of the magnetic recording medium may include a hard disk device (HDD), a flexible disk (FD), and a magnetic tape. Examples of the optical disk may include a DVD (Digital Versatile Disc), a DVD-RAM (Random Access Memory), a CD-ROM (Compact Disc Read Only Memory), and a CD-R (Recordable)/RW (ReWritable). Examples of the magneto-optical recording medium may include an MO (Magneto-Optical disk).

When the program is circulated, a portable recording medium such as a DVD and a CD-ROM where the program is recorded is sold. Further, the program can be stored in a storage device of a server computer, and can be transmitted from the server computer to another computer through a network.

The computer that executes the content processing program stores the program recorded in the portable recording medium or the program transmitted from the server computer in its storage device. In addition, the computer reads the program from its storage device and executes a process according to the program. Further, the computer can read a program directly from the portable recording medium and execute a process according to the program. Furthermore, the computer can sequentially execute processes according to the received programs, whenever the program is transmitted from the server computer.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

All examples and conditional language recited herein are intended for pedagogical purposes to aid the reader in understanding the invention and the concepts contributed by the inventor to furthering the art, and are to be construed as being without limitation to such For example recited examples and conditions, nor does the organization of such examples in the specification relate to a showing of the superiority and inferiority of the invention. Although the embodiments of the present inventions have been described in detail, it should be understood that various changes, substitutions, and alterations could be made hereto without departing from the spirit and scope of the invention, the scope of which is defined in the claims and their equivalents.

The invention claimed is:

1. A content processing apparatus that communicates contents with other apparatuses via a network, the content processing apparatus comprising:
    a memory that stores a program; and
    a processor that executes, based on the program, a procedure comprising:
    extracting undownloaded contents that still exist from a list of downloadable contents;
    storing a transmission situation of contents that the content processing apparatus communicates with one or more of the other apparatuses;
    storing a transmission history of the contents;
    determining a priority order of the undownloaded contents based on the transmission situation and the transmission history;
    downloading the contents in accordance with the priority order;
    calculating a similarity degree between the contents of the transmission history and the undownloaded contents, and
    reflecting the transmission situation on the similarity degree to determine the priority order.

2. The content processing apparatus according to claim 1, further comprising:
    a content storage part storing the contents.

3. The content processing apparatus according to claim 1, further comprising determining the priority order based on a result that is obtained by responding whether the contents are stored with respect to a content search request from another content processing apparatus.

4. The content processing apparatus according to claim 1, wherein
    the transmission history includes information that indicates whether the provided contents are deleted, and
    further comprising lowering the priority order with respect to the deleted contents.

5. The content processing apparatus according to claim 1, wherein
    the transmission history includes information that indicates a ratio of the provided contents, and
    further comprising raising the priority order with respect to the contents that have a large transmission ratio.

6. The content processing apparatus according to claim 1, wherein
    the transmission history includes information of a repeating apparatus that passes through the content processing apparatus including the undownloaded contents, and
    further comprising lowering the priority order with respect to the contents that are included in the content processing apparatus though which a large amount of repeating apparatuses pass.

7. The content processing apparatus according to claim 1, wherein
    the transmission history includes information of a transmission band of the content processing apparatus that includes the undownloaded contents, and
    further comprising lowering the priority order with respect to the contents that are included in the content processing apparatus that has a wide transmission band.

8. The content processing apparatus according to claim 1, wherein the transmission situation includes information to identify a content processing apparatus of a transmission destination, a transmission rate at time of communicating contents, and a ratio of the already transmitted contents.

9. The content processing apparatus according to claim 1, wherein
    the transmission history includes information that indicates a rate of transmission of the provided contents, and
    further comprising raising the priority order of contents that have a high transmission rate.

10. The content processing apparatus according to claim 1, further comprising raising the priority order in proportion to the similarity degree.

11. A content processing method that causes a computer to function as a content processing apparatus that communicates contents with other apparatuses via a network, the content processing method makes the computer to execute:
    extracting undownloaded contents that still exist from a list of downloadable contents;
    determining a transmission history of the contents that the content processing apparatus communicates with one or more of the other apparatuses;
    determining, by the computer, a priority order to download contents that are extracted at extracting based on a transmission situation of the contents exchanged with one or more of the other apparatuses and the transmission history; and
    downloading the contents in accordance with the priority order determined by the determining, wherein
    the determining further includes calculating a similarity degree between the contents of the transmission history and the undownloaded contents, and
    the determining reflects the transmission situation on the similarity degree to determine the priority order.

12. The content processing apparatus according to claim 11, wherein the transmission situation includes information to identify a content processing apparatus of a transmission destination, a transmission rate at time of communicating contents, and a ratio of the already transmitted contents.

13. The content processing apparatus according to claim 11, wherein
    the transmission history includes information that indicates a rate of transmission of the provided contents, and
    the determining raises the priority order of contents that have a high transmission rate.

14. The content processing apparatus according to claim 11, wherein the determining raises the priority order in proportion to the similarity degree.

15. A computer-readable recording medium storing a computer program for causing a computer to function as a content processing apparatus via a network, the computer program causing the computer to execute:
- extracting undownloaded contents that still exist from a list of downloadable contents;
- storing a transmission situation of contents that the content processing apparatus communicates with one or more other apparatuses;
- storing a transmission history of the contents that the content processing apparatus communicates with one or more of the other apparatuses;
- determining a priority order of undownloaded contents that are extracted at the extracting based on the stored transmission situation and the stored transmission history; and
- downloading the contents in accordance with the priority order determined by the determining, wherein
- the determining further includes calculating a similarity degree between the contents of the transmission history and the undownloaded contents, and
- the determining reflects the transmission situation on the similarity degree to determine the priority order.

16. The content processing apparatus according to claim 15, wherein the transmission situation includes information to identify a content processing apparatus of a transmission destination, a transmission rate at time of communicating contents, and a ratio of the already transmitted contents.

17. The content processing apparatus according to claim 15, wherein
- the transmission history includes information that indicates a rate of transmission of the provided contents, and
- determining raises the priority order of contents that have a high transmission rate.

18. The content processing apparatus according to claim 15, wherein the determining raises the priority order in proportion to the similarity degree.

* * * * *

UNITED STATES PATENT AND TRADEMARK OFFICE
CERTIFICATE OF CORRECTION

| | | |
|---|---|---|
| PATENT NO. | : 8,706,853 B2 | Page 1 of 1 |
| APPLICATION NO. | : 12/507245 | |
| DATED | : April 22, 2014 | |
| INVENTOR(S) | : Kamiwada et al. | |

It is certified that error appears in the above-identified patent and that said Letters Patent is hereby corrected as shown below:

In the Claims

Column 16, Line 10, Claim 6, delete "though" and insert -- through --, therefor.

Signed and Sealed this
Twenty-ninth Day of July, 2014

Michelle K. Lee
*Deputy Director of the United States Patent and Trademark Office*